(12) United States Patent
Burns

(10) Patent No.: US 6,938,092 B2
(45) Date of Patent: Aug. 30, 2005

(54) TCP OFFLOAD DEVICE THAT LOAD BALANCES AND FAILS-OVER BETWEEN AGGREGATED PORTS HAVING DIFFERENT MAC ADDRESSES

(75) Inventor: David A. Burns, Aston, PA (US)

(73) Assignee: Alacritech, Inc., San Jose, CA (US)

( * ) Notice: Subject to any disclaimer, the term of this patent is extended or adjusted under 35 U.S.C. 154(b) by 374 days.

(21) Appl. No.: 10/229,564

(22) Filed: Aug. 27, 2002

(65) Prior Publication Data

US 2003/0140124 A1 Jul. 24, 2003

Related U.S. Application Data

(63) Continuation of application No. 09/801,488, filed on Mar. 7, 2001, now Pat. No. 6,687,758.

(51) Int. Cl.[7] .............................................. G06F 15/16
(52) U.S. Cl. ........................ 709/230; 709/245; 709/200
(58) Field of Search ................................ 709/200, 230, 709/245, 250, 238, 236, 228, 232, 225, 217, 212

(56) References Cited

U.S. PATENT DOCUMENTS

| | | | |
|---|---|---|---|
| 4,366,538 A | 12/1982 | Johnson et al. ............. | 364/200 |
| 4,991,133 A | 2/1991 | Davis et al. ................ | 364/900 |
| 5,056,058 A | 10/1991 | Hirata et al. ................ | 709/230 |
| 5,058,110 A | 10/1991 | Beach et al. ................ | 370/85.6 |
| 5,097,442 A | 3/1992 | Ward et al. .................... | 365/78 |
| 5,163,131 A | 11/1992 | Row et al. ................... | 395/200 |
| 5,212,778 A | 5/1993 | Dally et al. .................. | 395/400 |
| 5,280,477 A | 1/1994 | Trapp ......................... | 370/85.1 |
| 5,289,580 A | 2/1994 | Latif et al. ................... | 395/275 |
| 5,303,344 A | 4/1994 | Yokoyama et al. ......... | 395/275 |
| 5,412,782 A | 5/1995 | Hausman et al. ........... | 395/250 |
| 5,448,566 A | 9/1995 | Richter et al. ............. | 370/94.1 |
| 5,485,579 A | 1/1996 | Hitz et al. ............. | 395/200.12 |
| 5,506,966 A | 4/1996 | Ban ........................... | 395/250 |

(Continued)

FOREIGN PATENT DOCUMENTS

| | | |
|---|---|---|
| WO | WO/98/19412 | 5/1998 |
| WO | WO/98/50852 | 11/1998 |
| WO | WO/99/04343 | 1/1999 |
| WO | WO 99/65219 | 12/1999 |
| WO | WO 00/13091 | 3/2000 |
| WO | WO 01/04770 A2 | 1/2001 |
| WO | WO 01/05107 A1 | 1/2001 |
| WO | WO 01/05116 A2 | 1/2001 |
| WO | WO 01/05123 A1 | 1/2001 |
| WO | WO 01/40960 A1 | 6/2001 |

OTHER PUBLICATIONS

Form 10–K for Exelan, Inc., for the fiscal year ending Dec. 31, 1987 (10 pages).

(Continued)

Primary Examiner—Zarni Maung
Assistant Examiner—Kristina Honeycutt
(74) Attorney, Agent, or Firm—T. Lester Wallace; Mark Lauer; Silicon Edge Law Group LLP

(57) ABSTRACT

TCP/IP traffic passing over a TCP connection is initially load balanced by a TCP offload network interface device (NID) in fast-path between multiple ports of an aggregation team. A failure then occurs on one of the ports. Processing of the TCP connection then switches to slow-path. The function of the failed port is then assumed by another functioning port of the team such that fast-path processing of the TCP connection by the TCP offload NID automatically resumes. The two ports of the TCP offload NID (the failed port and the port that assumes its functionality) use different MAC addresses. Fast-path load balancing and fail-over are therefore possible without the use of a Fast-Etherchannel switch that would have required the two ports to use the same MAC address.

22 Claims, 4 Drawing Sheets

RECEIVE PORT FAILS

U.S. PATENT DOCUMENTS

| | | | |
|---|---|---|---|
| 5,511,169 A | 4/1996 | Suda | 395/280 |
| 5,517,668 A | 5/1996 | Szwerinski et al. | 395/800 |
| 5,548,730 A | 8/1996 | Young et al. | 395/280 |
| 5,566,170 A | 10/1996 | Bakke et al. | 370/60 |
| 5,588,121 A | 12/1996 | Reddin et al. | 395/200.15 |
| 5,590,328 A | 12/1996 | Seno et al. | 395/675 |
| 5,592,622 A | 1/1997 | Isfeld et al. | 395/200.02 |
| 5,598,410 A | 1/1997 | Stone | 370/469 |
| 5,629,933 A | 5/1997 | Delp et al. | 370/411 |
| 5,634,099 A | 5/1997 | Andrews et al. | 395/200.07 |
| 5,634,127 A | 5/1997 | Cloud et al. | 395/680 |
| 5,642,482 A | 6/1997 | Pardillos | 395/200.2 |
| 5,664,114 A | 9/1997 | Krech, Jr. et al. | 395/200.64 |
| 5,671,355 A | 9/1997 | Collins | 395/200.2 |
| 5,678,060 A | 10/1997 | Yokoyama et al. | 709/212 |
| 5,692,130 A | 11/1997 | Shobu et al. | 395/200.12 |
| 5,699,317 A | 12/1997 | Sartore et al. | 395/230.06 |
| 5,701,434 A | 12/1997 | Nakagawa | 395/484 |
| 5,701,516 A | 12/1997 | Cheng et al. | 395/842 |
| 5,749,095 A | 5/1998 | Hagersten | 711/141 |
| 5,751,715 A | 5/1998 | Chan et al. | 370/455 |
| 5,752,078 A | 5/1998 | Delp et al. | 395/827 |
| 5,758,084 A | 5/1998 | Silverstein et al. | 395/200.58 |
| 5,758,089 A | 5/1998 | Gentry et al. | 395/200.64 |
| 5,758,186 A | 5/1998 | Hamilton et al. | 395/831 |
| 5,758,194 A | 5/1998 | Kuzma | 395/886 |
| 5,771,349 A | 6/1998 | Picazo, Jr. et al. | 395/188.01 |
| 5,790,804 A | 8/1998 | Osborne | 395/200.75 |
| 5,794,061 A | 8/1998 | Hansen et al. | 395/800.01 |
| 5,802,580 A | 9/1998 | McAlpine | 711/149 |
| 5,809,328 A | 9/1998 | Nogales et al. | 395/825 |
| 5,812,775 A | 9/1998 | Van Seters et al. | 395/200.43 |
| 5,815,646 A | 9/1998 | Purcell et al. | 395/163 |
| 5,878,225 A | 3/1999 | Bilansky et al. | 395/200.57 |
| 5,913,028 A | 6/1999 | Wang et al. | 395/200.33 |
| 5,920,705 A * | 7/1999 | Lyon et al. | 709/240 |
| 5,930,830 A | 7/1999 | Mendelson et al. | 711/171 |
| 5,931,918 A | 8/1999 | Row et al. | 709/300 |
| 5,935,205 A | 8/1999 | Murayama et al. | 709/216 |
| 5,937,169 A | 8/1999 | Connery et al. | 395/200.8 |
| 5,941,969 A | 8/1999 | Ram et al. | 710/128 |
| 5,941,972 A | 8/1999 | Hoese et al. | 710/129 |
| 5,950,203 A | 9/1999 | Stakuis et al. | 707/10 |
| 5,991,299 A | 11/1999 | Radogna et al. | 370/392 |
| 5,996,024 A | 11/1999 | Blumenau | 709/301 |
| 6,005,849 A | 12/1999 | Roach et al. | 370/276 |
| 6,009,478 A | 12/1999 | Panner et al. | 710/5 |
| 6,016,513 A | 1/2000 | Lowe | 709/250 |
| 6,021,446 A | 2/2000 | Gentry, Jr. | 709/303 |
| 6,026,452 A | 2/2000 | Pitts | 710/56 |
| 6,034,963 A | 3/2000 | Minami et al. | 370/401 |
| 6,044,438 A | 3/2000 | Olnowich | 711/130 |
| 6,047,356 A | 4/2000 | Anderson et al. | 711/129 |
| 6,057,863 A | 5/2000 | Olarig | 345/520 |
| 6,061,368 A | 5/2000 | Hitzelberger | 370/537 |
| 6,065,096 A | 5/2000 | Day et al. | 711/114 |
| 6,141,705 A | 10/2000 | Anand et al. | 710/15 |
| 6,151,297 A * | 11/2000 | Congdon et al. | 370/216 |
| 6,173,333 B1 | 1/2001 | Jolitz et al. | |
| 6,226,680 B1 | 5/2001 | Boucher et al. | 709/230 |
| 6,246,683 B1 | 6/2001 | Connery et al. | 370/392 |
| 6,247,060 B1 | 6/2001 | Boucher et al. | 709/238 |
| 6,314,525 B1 * | 11/2001 | Mahalingham et al. | 714/4 |
| 6,345,301 B1 | 2/2002 | Burns et al. | 709/230 |
| 6,356,951 B1 | 3/2002 | Gentry, Jr. | 709/250 |
| 6,389,468 B1 | 5/2002 | Muller et al. | 709/226 |
| 6,427,169 B1 | 7/2002 | Elzur | 709/224 |
| 6,427,171 B1 * | 7/2002 | Craft et al. | 709/230 |
| 6,427,173 B1 * | 7/2002 | Boucher et al. | 709/238 |
| 6,434,651 B1 | 8/2002 | Gentry, Jr. | 710/260 |
| 6,449,656 B1 | 9/2002 | Elzur et al. | 709/236 |
| 6,453,360 B1 | 9/2002 | Muller et al. | 709/250 |
| 6,512,774 B1 * | 1/2003 | Vepa et al. | 370/401 |
| 6,567,377 B1 * | 5/2003 | Vepa et al. | 370/230 |
| 6,587,438 B1 * | 7/2003 | Brendel | 370/238 |
| 2001/0004354 A1 | 6/2001 | Jolitz | |
| 2001/0025315 A1 | 9/2001 | Jolitz | |

OTHER PUBLICATIONS

Form 10–K for Exelan, Inc., for the fiscal year ending Dec. 31, 1988 (10 pages).

Article from Rice University entitled "LRP: A New Network Subsystem Architecture for Server Systems", by Peter Druschel and Gaurav Banga, Rice University, Oct. 1996, 15 pages.

Internet RFC/STD/FYI/BCP Archives article with heading "RFC2140" entitled "TCP Control Block Interdependence", web address http://www.faqs.org/rfcs/rfc2140.html, 9 pages, printed Sep. 20, 2002.

Internet pages entitled "Hardware Assisted Protocol Processing", (which Eugene Feinber is working on), 1 page, printed Nov. 25, 1998.

Zilog product Brief entitled "Z85C30 CMOS SCC Serial Communication Controller", Zilog Inc., 3 pages, 1997.

Internet pages of Xpoint Technologies, Inc. entitled "Smart LAN Work Requests", 5 pages, printed Dec. 19, 1997.

Internet pages entitled: Asante and 100BASE–T Fast Ethernet. 7 pages, printed May 27, 1997.

Internet pages entitled: A Guide to the Paragon XP/S–A7 Supercomputer at Indiana University. 13 pages, printed Dec. 21, 1998.

Richard Stevens, "TCP/IP Illustrated, vol. 1, The Protocols", pp. 325–326 (1994).

Internet pages entitled: Northridge/Southbridge vs. Intel Hub Architecture, 4 pages, printed Feb. 19, 2001.

Gigabit Ethernet Technical Brief, Achieving End–to–End Performance. Alteon Networks, Inc., First Edition, Sep. 1996.

Internet pages directed to Technical Brief on Alteon Ethernet Gigabit NIC technology, www.alteon.com, 14 pages, printed Mar. 15, 1997.

VIA Technologies, Inc. article entitled "VT8501 Apollo MVP4", pp. i–iv, 1–11, cover and copyright page, revision 1.3, Feb. 1, 2000.

iReady News Archives article entitled "iReady Rounding Out Management Team with Two Key Executives", http://www.ireadyco.com/archives/keyexec.html, 2 pages, printed Nov. 28, 1998.

"Toshiba Delivers First Chips to Make Consumer Devices Internet–Ready Based On iReady's Design," Press Release Oct., 1998, 3 pages, printed Nov. 28, 1998.

Internet pages from iReady Products, web sitehttp://www.ireadyco.com/products,html, 2 pages, downloaded Nov. 25, 1998.

iReady News Archives, Toshiba, iReady shipping Internet chip, 1 page, printed Nov. 25, 1998.

Interprophet article entitled "Technology", http://www.interprophet.com/technology.html, 17 pages, printed Mar. 1, 2000.

iReady Corporation, article entitled "The I–1000 Internet Tuner", 2 pages, date unknown.

iReady article entitled "About Us Introduction", Internet pages fromhttp://www.iReadyco.com/about.html, 3 pages, printed Nov. 25, 1998.

iReady News Archive article entitled "Revolutionary Approach to Consumer Electronics Internet Connectivity Funded", San Jose, CA, Nov. 20, 1997. 2 pages, printed Nov. 2, 1998.

iReady News Archive article entitled "Seiko Instruments Inc. (SII) Introduces World's First Internet–Ready Intelligent LCD Modules Based on Iready Technology," Santa Clara, CA and Chiba, Japan, Oct. 26, 1998. 2 pages, printed Nov. 2, 1998.

NEWSwatch article entitled "iReady internet Tuner to Web Enable Devices", Tuesday, Nov. 5, 1996, printed Nov. 2, 1998.

EETimes article entitled "Tuner for Toshiba, Toshiba Taps iReady for Internet Tuner", by David Lammers, 2 pages, printed Nov. 2, 1998.

"Comparison of Novell Netware and TCP/IP Protocol Architectures", by J.S. Carbone, 19 pages, printed Apr. 10, 1998.

Adaptec article entitled "AEA–7110C–a DuraSAN product", 11 pages, printed Oct. 1, 2001.

iSCSI HBA article entitled "iSCSI and 2Gigabit fibre Channel Host Bus Adapters from Emulex, QLogic, Adaptec, JNI", 8 pages, printed Oct. 1, 2001.

iSCSI HBA article entitled "FCE–3210/6410 32 and 64–bit PCI–to–Fibre Channel HBA", 6 pages, printed Oct. 1, 2001.

ISCSI.com article entitled "iSCSI Storage", 2 pages, printed Oct. 1, 2001.

"Two–Way TCP Traffic Over Rate Controlled Channels: Effects and Analysis", by Kalampoukas et al., IEEE Transactions on Networking, vol. 6, No. 6, Dec. 1998.

IReady News article entitled "Toshiba Delivers First Chips to Make Consumer Devices Internet–Ready Based on iReady Design", Santa Clara, CA, and Tokyo, Japan, Oct. 14, 1998, printed Nov. 2, 1998.

U.S. Appl. No. 08/964,304, by Napolitano, et al., entitled "File Array Storage Architecture", filed Nov. 4, 1997.

"File System Design For An NFS File Server Appliance", Article by D. Hitz, et al., 13 pages, date unknown.

Adaptec Press Release article entitled "Adaptec Announces EtherStorage Technology", 2 pages, May 4, 2000, printed Jun. 14, 2000.

Adaptec article entitled "EtherStorage Frequently Asked Questions", 5 pages, printed Jul. 19, 2000.

Adaptec article entitled "EtherStorage White Paper", 7 pages, printed Jul. 19, 2000.

CIBC World Markets article entitled "Computers; Storage", by J. Berlino et al., 9 pages, dated Aug. 7, 2000.

Merrill Lynch article entitled "Storage Futures", by S. Milunovich, 22 pages, dated May 10, 2000.

CBS Market Watch article entitled "Montreal Start–Up Battles Data Storage Bottleneck", by S. Taylor, dated Mar. 5, 2000, 2 pages, printed Mar. 7, 2000.

Internet–draft article entitled "SCSI/TCP (SCSI over TCP)", by J. Satran et al., 38 pages, dated Feb. 2000, printed May 19, 2000.

Internet pages entitled Technical White Paper—Xpoint's Disk to LAN Acceleration Solution for Windows NT Server, printed Jun. 5, 1997.

Jato Technologies article entitled Network Accelerator Chip Architecture, twelve–slide presentation, printed Aug. 19, 1998.

EETimes article entitled Enterprise System Uses Flexible Spec, dated Aug. 10, 1998, printed Nov. 25, 1998.

Internet pages entitled "Smart Ethernet Network Interface Cards", which Berend Ozceri is developing, printed Nov. 25, 1998.

Internet pages entitled "Hardware Assisted Protocol Processing", which Eugene Feinberg is working on, printed Nov. 25, 1998.

Internet pages of Xaqti corporation entitled "GigaPower Protocol Processor Product Review," printed Nov. 25, 1999.

Internet pages entitled "DART: Fast Application Level Networking via Data–Copy Avoidance," by Robert J. Walsh, printed Jun. 3, 1999.

Internet pages of InterProphet entitled "Frequently Asked Questions", by Lynne Jolitz, printed Jun. 14, 2000.

Internet pages entitled iReady Products, printed Nov. 25, 1998.

Andrew S. Tanenbaum, Computer Networks, Third Edition, 1996, ISBN 0–13–349945–6.

"Third Supplemental Information Disclosure Statement per 37 C.F.R. §1.98", dated Aug. 7, 2002 relating to Exelan Inc. as submitted in U.S. Appl. No. 09/801,488.

WindRiver article entitled "Tornado: For Intelligent Network Acceleration", copyright Wind River Systems, 2001, 2 pages.

WindRiver White Paper entitled "Complete TCP/IP Offload for High–Speed Ethernet Networks", Copyright Wind River Systems, 2002, 7 pages.

Intel article entitled "Solving Server Bottlenecks with Intel Server Adapters", Copyright Intel Corporation, 1999, 8 pages.

* cited by examiner

RECEIVE PORT FAILS

TRANSMIT PORT FAILS

TCP OFFLOAD DEVICE THAT LOAD BALANCES AND FAILS-OVER BETWEEN AGGREGATED PORTS HAVING DIFFERENT MAC ADDRESSES

CROSS-REFERENCE TO RELATED APPLICATIONS

The present application is a continuation of and claims the benefit under 35 USC § 120 from U.S. patent application Ser. No. 09/801,488 U.S. Pat. No. 6,687,758, filed Mar. 7, 2001. The subject matter of U.S. application Ser. No. 09/801,488 is incorporated herein by reference.

CROSS-REFERENCE TO COMPACT DISC APPENDIX

Compact Disc Appendix, which is a part of the present disclosure, is one recordable Compact Disc (CD-R) containing information that is part of the disclosure of the present patent document. The Compact Disc contains source code for a port aggregation driver in accordance with an embodiment of the present invention. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

BACKGROUND

"Port aggregation" (also called link aggregation) is a method by which two or more network connections (sometimes called links) are grouped together at a multi-port network device to create a single logical connection (sometimes called a single logical link). Network traffic can be "load balanced" between multiple aggregated ports of the multi-path network device, thereby increasing bandwidth available for the single logical connection without having to increase the bandwidth of any of the associated underlying network connections. Typically associated with port aggregation is another method called "port fail-over." If functionality of one physical port is lost, then another port assumes the functionality of the lost port such that the logical connection is maintained. Such a port fail-over method provides increased reliability for the single logical network connection, in comparison with the reliability of a single physical network connection.

FIG. 1 (Prior Art) is a diagram of a local device 1 that supports port aggregation, load balancing and fail-over functionality. In the illustrated example, local device 1 is both to receive network information from and to transmit network information to a remote device 2. Local device 1 includes a host portion 3 as well as a network interface device portion 4. The network interface device portion 4 may take the form of an Intelligent Network Interface Card (INIC) providing multiple media access and control (MAC) ports. Host portion 3 typically includes a central processing unit (CPU) that executes a multi-layer protocol processing stack 5. Stack 5 includes a network interface device driver 6, a port aggregation driver 7, an IP protocol processing layer 8, a TCP protocol processing layer 9, and one or more upper layers 10. In the example of FIG. 1, the port aggregation driver and the network interface device driver are together considered to be a network access layer 11 of the stack.

Incoming packets received onto local device 1 are received onto network interface device 4 and then pass through the NID device driver 6 and the port aggregation driver 7 and then up through the various layers of the stack 5 to upper layer 10. In the case of a read, for example, the upper layer 10 of the stack may be an Internet SCSI (ISCSI) layer that identifies a location in destination storage 12 where the data is to be placed. The data is transferred in the form a multi-packet message. Each packet of the message is received by local device 1, passes through network interface device 4, and is processed by each successive layer of the protocol stack 5, thereby often consuming significant processing resources of the CPU that executes the stack. This often time consuming protocol processing through successive layers of the protocol stack is called "slow-path" processing.

To offload the CPU of this protocol processing load, special functionality is built into network interface device 4 and a special ATCP stack portion 13 is added to stack 5. Accordingly, certain types of network communications are handled in a "fast-path" whereby IP and TCP protocol processing tasks are handled by the network interface device 4, thereby offloading the CPU of the host of these tasks. In the example of a read, the data payloads of the various packets of the message are placed directly into the destination storage 12 at a location identified by upper layer 10. The data payloads are placed into destination storage 12 without stack 5 doing any or substantially any IP or TCP protocol processing. For additional information on such a network interface device, on an ATCP stack, and on fast-path operation, see the discussion of the INIC and the associated ATCP stack in U.S. Pat. No. 6,247,060 (the subject matter of which is incorporated herein by reference).

To support port aggregation, load balancing and fail-over functionality, a Fast-Etherchannel switch 13 is provided such that local device 1 can send or receive information to remote device 2 via two ports (Port 1 or Port 2) and two physical connections 14 and 15, rather than just one port and one physical connection. In the case where Fast-Etherchannel switch 13 is a rack-mounted Hewlett-Packard HPJ4121A ProCurve 4000M switch, both Port 1 and Port 2 are assigned to have the same media access address (MAC address A in this example). Both of the ports Port 1 and Port 2 are grouped together into a "team" for port aggregation purposes. If transmission and reception for a TCP connection were passing over physical connection 14 and Port 1, and then communications over physical connection 14 were for some reason to fail, then transmission and reception for the TCP connection would be communicated via physical connection 15 and Port 2. Although this scheme works in that fast-path communications are supported in combination with port aggregation, load balancing and fail-over functionality, the need to provide the Fast-Etherchannel switch is undesirable. Fast-Etherchannel switches may be expensive. A solution is desired.

SUMMARY

A multi-port TCP offload network interface device (NID) supports both "fast-path" and "slow-path" operations. The TCP offload device is coupled to a host. The host executes a stack of protocol processing layers.

In "fast-path" operation, IP and TCP protocol processing of particular TCP network connections is performed by the NID, thereby offloading the stack of the host of the task of performing IP and TCP protocol processing on network traffic over these TCP connections. In the case of a multi-packet upper layer (session layer or application layer) message being received onto the NID across a TCP connection being handled in "fast-path," the NID performs all or substantially all TCP and IP protocol processing on the incoming packets, and places the data payloads of the packets free of TCP and IP headers directly into a destination on the host. The location of the destination on the host is, in one embodiment, identified by an upper layer program running on the host. In the case of the transmission of a packet over a TCP connection being handled in the fast-path, the NID stores a template header for the TCP connection. The NID obtains from the host the data to be transmitted, splits up the data into segments, adds a header to each segment of data using the template header, and then transmits the resulting packets from the NID.

In "slow-path" operation, on the other hand, the host stack performs substantial IP and TCP processing. The NID receives incoming packets from the network and forwards the packets to the host stack for further processing in the case of a reception. In the case of transmission, the host stack forms packets, passes these packets to the NID, and the NID transmits them onto the network.

In accordance with one embodiment of the present invention, such a multi-port TCP offload NID handles a TCP connection in fast-path over a plurality of aggregated ports ("members" of a "team") such that each of the aggregated ports uses a different MAC address. Fail-over mechanisms are described for failing over and resuming fast-path operation after a failure is detected on a port used to receive packets of the fast-path TCP connection. Fail-over mechanisms are also described for failing over and resuming fast-path operation after a failure is detected on a port used to transmit packets of the fast-path TCP connection. In each of these fail-over situations, traffic passing over the TCP connection is initially load balanced in fast-path between multiple ports of the team, a failure then occurs on one of the ports, processing of the TCP connection then switches to slow-path, and then the function of the failed port is automatically assumed by another functioning port of the team such that fast-path processing of the TCP connection resumes. The failed port and the port that assumes its functionality use different MAC addresses. Fast-path load balancing and/or fail-over are therefore possible without the use of a Fast-Etherchannel switch that would have required the ports to use the same MAC address. A specific embodiment of port aggregation software is disclosed that manages the MAC addresses of the team members.

Other embodiments and details are also described below. This summary does not purport to define the invention. The claims, and not this summary, define the invention.

DETAILED DESCRIPTION

Figure 1:
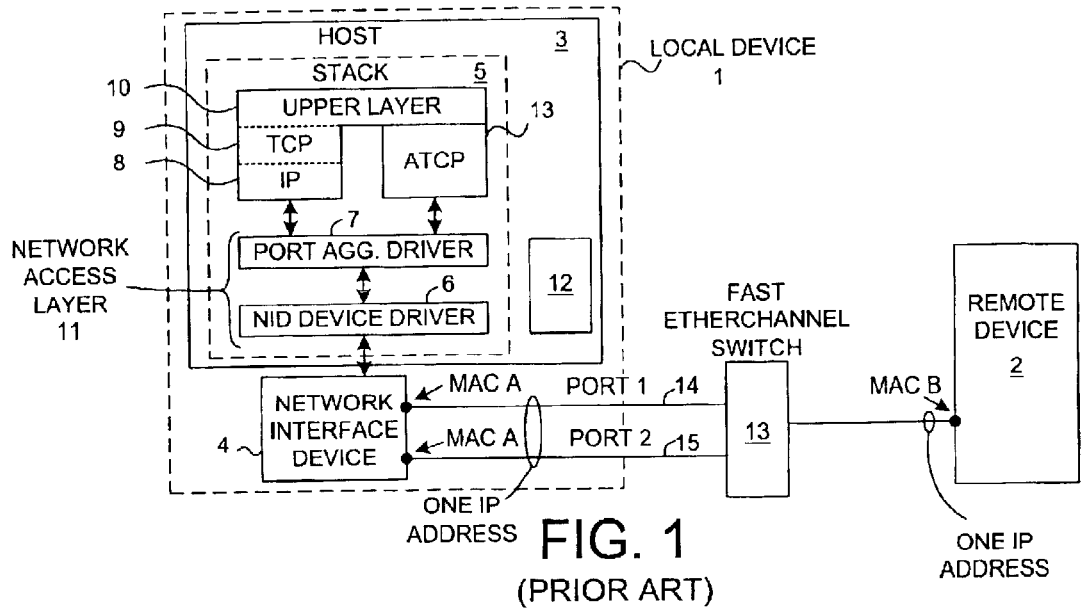
FIG. 1 (Prior Art) is a diagram of a prior art fast-path network interface device (NID) that supports port aggregation, load balancing and fail-over by the use of a Fast-Etherchannel switch.
Figure 2:
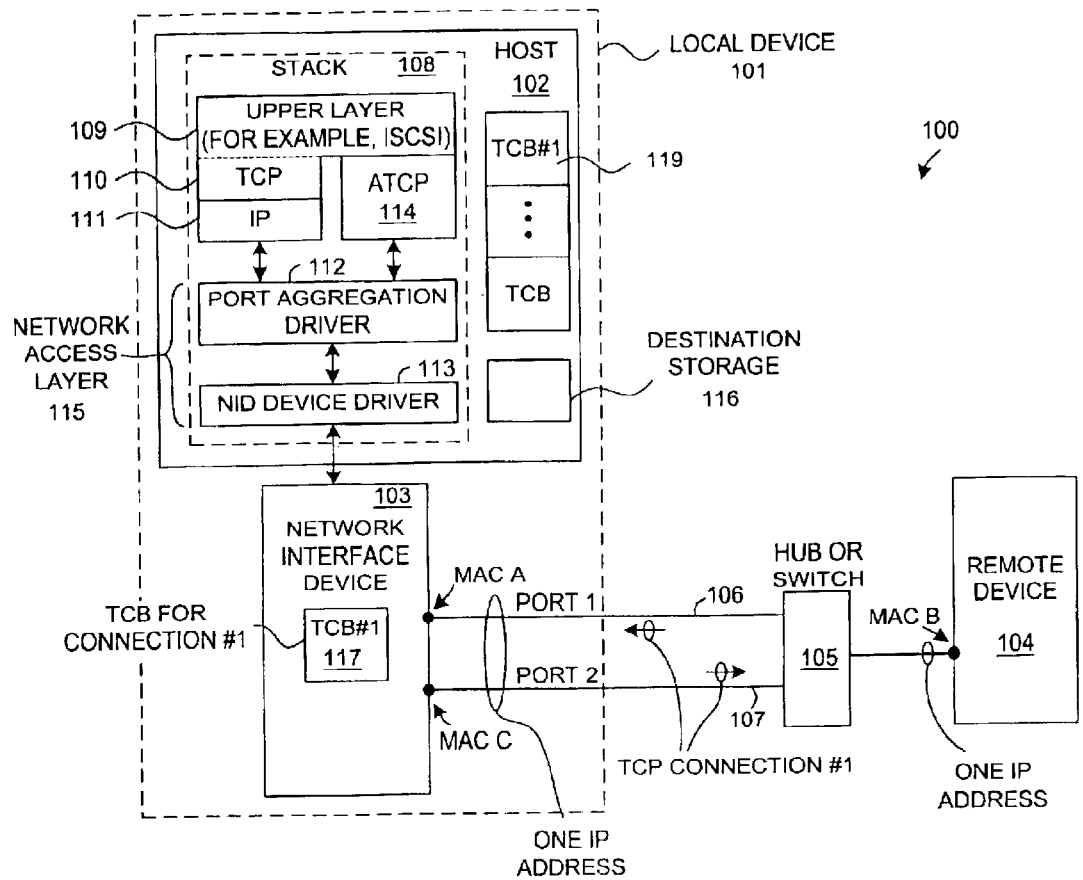
FIG. 2 is a simplified diagram of system 100 in accordance with an embodiment of the present invention, wherein a fast-path TCP offload network interface device (NID) 103 supports port aggregation, load balancing and fail-over without the use of a Fast-Etherchannel switch.

FIG. 2 is a diagram of system 100 in accordance with one exemplary embodiment of the present invention. System 100 includes a local device 101 comprising a host portion 102 and a TCP offload network interface device (NID) portion 103. Local device 101 receives TCP/IP network communications from and sends TCP/IP network communications to a remote device 104 via an intermediary device 105. Intermediary device 105 may, for example, be a Fast Ethernet hub or switch. In the example of FIG. 2, intermediary device 105 is a switch. In contrast to the system set forth in FIG. 1, this switch 105 is not a Fast Etherchannel switch but rather is a less complex (and hopefully less expensive) Fast Ethernet switch. Switch 105 may, for example, be a NetGear FS108 switch. Switch 105 is connected to local device 101 via two physical connections 106 and 107. Network connections 106 and 107 may, for example, be CAT5 network cables. Physical connection 106 is coupled to Port 1 of network interface device 103 whereas physical connection 107 is coupled to Port 2 of network interface device 103.

Host portion 102 includes a CPU that executes a multi-layer network protocol processing stack 108. Stack 108 includes an upper layer 109 (for example, an application layer and/or a session layer), a TCP layer 110, an IP layer 111, a port aggregation driver 112, a network interface device (NID) device driver 113, and an ATCP stack portion 114. An ISCSI layer is an example upper layer 109. The port aggregation driver 112 and the NID device driver 113 may together be considered to comprise a network access layer 115 of stack 108. Layers 109–111 are, in one embodiment, part of the stack of a Microsoft Windows operating system.

For additional details on a port aggregation driver, see U.S. patent application Ser. No. 09/801,488, filed Mar. 7, 2001, including the subject matter on its Compact Disc Appendix (the subject matter of which is incorporated herein by reference). For additional details on a stack that supports fast-path operations, see U.S. patent application Ser. No. 10/208,093, filed Jul. 29, 2002, entitled "Protocol Processing Stack For Use With Intelligent Network Interface Device", by Peter Craft et al.

Network communications flowing through an ordinary network interface card (NIC) are typically processed by the various layers of a stack, one layer at a time. If in the example of FIG. 2 the CPU of host 102 were to execute the code of the various layers of the stack for all the network communications received onto and passing out of network interface device 103, then the CPU might be significantly burdened. Having to perform the network processing for all the layers of the stack would likely have the undesirable effect of reducing the amount of processing power available to carry out other desired functions.

To offload the CPU of such sequential network protocol processing tasks, TCP offload NID 103 includes special hardware and software. This special hardware and software provides a "fast-path" whereby all or substantially all the TCP and IP protocol processing for particular TCP network connections is performed by TCP offload NID 103 rather than by host 102.

For each such TCP connection to be handled in fast-path, an associated Transmit Control Block (TCB) is maintained on TCP offload NID 103. (The TCB used for "fast-path" processing is also sometimes referred to as a Communication Control Block (CCB.)) The TCB is a block of information that stores the state of the TCP connection. The TCB contains MAC source and destination addresses for the local and remote device respectively, the IP source and destination addresses of the connection, and the TCP source and destination ports of the connection. The TCB in the present example also contains a list of buffer addresses identifying a location in destination storage 116 on host 102, information on the length of a message being communicated across the TCP connection, TCP sequence numbers reflecting packets received and transmitted and acknowledged, TCP variables such as timers and receive and transmit windows for sliding window protocols, and status information regarding each of the protocol layers of the message.

TCP offload NID 103 uses the IP and TCP source and destination addresses of the TCB to identify packets. For example, when a packet is received onto NID 103 from switch 105, the NID 103 examines the headers of the packet. If the packet headers have IP source and destination addresses and TCP source and destination ports that match the IP source and destination addresses and the TCP source and destination ports in one of the TCBs (for example, TCB 117) maintained on NID 103, then the packet is identified as being associated with the TCP connection associated with TCB. If this match occurs and if the packet does not give rise to one of a set of error and/or exception conditions, then the packet is processed via the "fast-path." For additional information on "fast-path" operation, see U.S. Pat. No. 6,247,060 (the subject matter of which is incorporated herein by reference).

In the case where a large block of data is to be transferred from remote device 104 to a location in destination storage 116 via the fast-path, the block of data is sectioned up and transferred from remote device 104 to NID 103 in the form of a plurality of packets. NID 103 receives each of packets, determines that the packet matches the associated TCB, removes the header information from the packet's data payload, and then DMA transfers the data payload directly to a section of destination storage 116 identified by upper layer 109. The data is placed into destination storage 116 by NID 103, free of headers. The data is therefore placed into the destination storage 116 without the stack 108 having to perform any or substantially any TCP and IP protocol processing. The operation of the NID 103 and ATCP stack 114 is simplified in the description above. For a more detailed description of the structure and operation of a network interface device that performs "fast-path" processing, and of the structure and operation of an ATCP stack, see: 1) U.S. Pat. No. 6,247,060, and 2) U.S. Published Patent Application 20010047433, published Nov. 29, 2001 (the subject matter of these documents is incorporated herein by reference).

Figure 4:
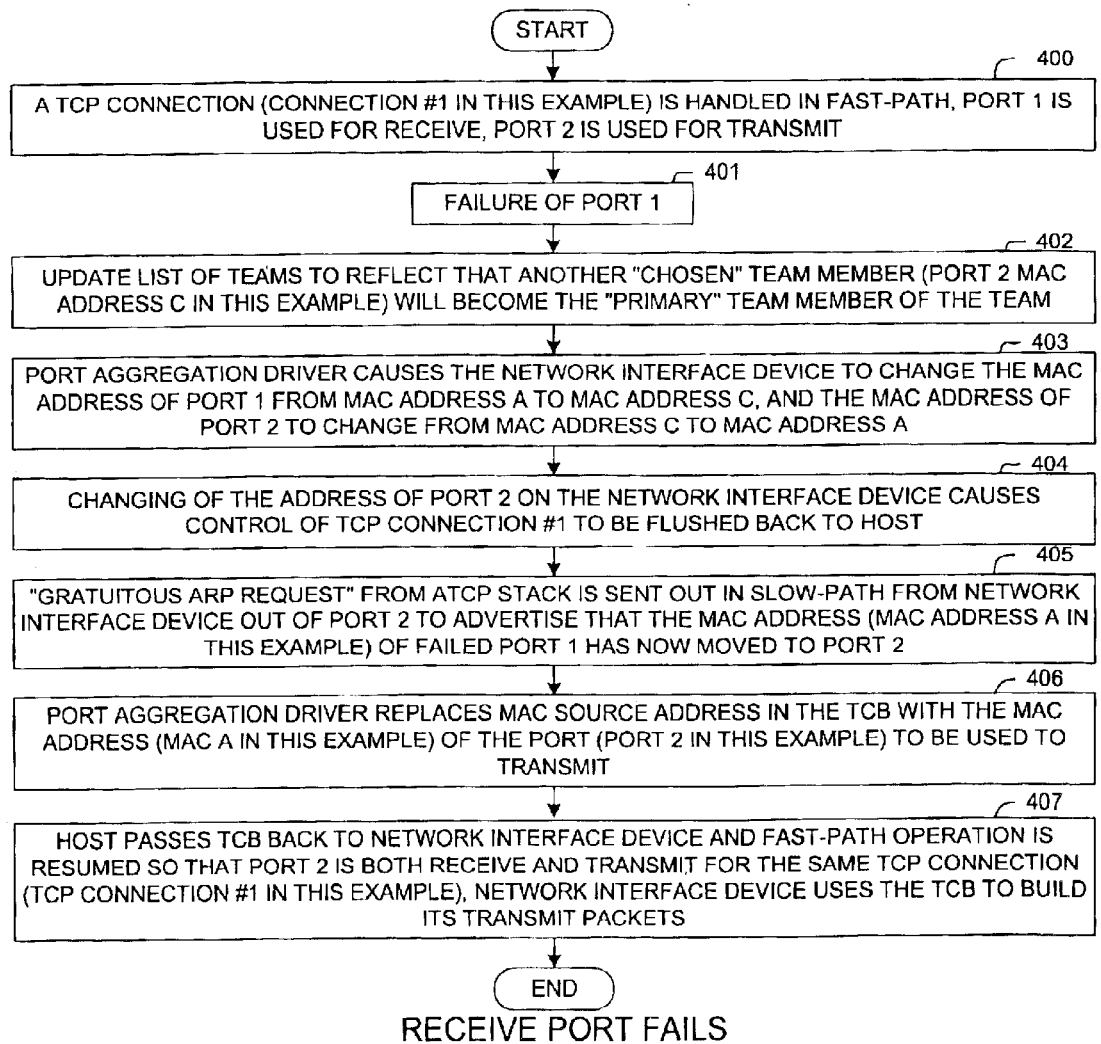
FIG. 4 is a flowchart of a method in accordance with an embodiment of the present invention where a receive port fails.

FIG. 4 is a flowchart illustrating a method in accordance with one embodiment of the present invention wherein a port fails that is used to receive network communications for a fast-path TCP connection. The method is carried out by the system of FIG. 2.

In an initial state (step 400), TCP/IP packets associated with TCP connection #1 are being received onto NID 103 via Port 1 and are being transmitted from NID 103 via Port 2. This operation is set forth to describe one type of load balancing that is implemented with "fast-path" processing. For example, if the receive from TCP connection #1 were to represent a significant amount of traffic and if the transmit from TCP connection #1 were also to represent a significant amount of traffic, then having both the receive and transmit for connection #1 occurring over the same physical connection 106 might increase latencies and delays and might overburden the available bandwidth of physical connection 106 and/or the associated ports. In the example of FIG. 2, however, the receive for connection #1 is set up to occur over physical connection 106 and the transmit for connection #1 is set up to occur over physical connection 107, thereby better distributing the traffic over the two physical connections 106 and 107.

Load balanced TCP connection #1 is being handled in "fast-path." Network interface device 103 therefore has control of a TCB 117 associated with the TCP connection #1. When in "fast-path," NID 103 carries out "fast-path" commands. "Fast-path" commands may, for example, include a "HANDOUT1" command (the first phase of a TCB handout indicates the intention of host 102 to hand over control of a connection to NID 103,) a "HANDOUT2" command (the second phase of a TCB handout that actually commits NID 103 to fast-path operation), a "SENDMDL" command (a transmit request), a "RECEIVEMDL" command, a "RECEIVEINTERMEDIATEMDL" command, a "WINDOWUPDATE" command (a transmit null), a "FLUSH" command (a release context), and a "CLOSE" command (a close request). For additional information on these commands, see U.S. patent application Ser. No. 10/208,093, filed Jul. 29, 2002, entitled "Protocol Processing Stack For Use With Intelligent Network Interface Device", by Peter Craft et al. (the subject matter of which is incorporated herein by reference).

Next (step 401), a failure occurs on Port 1 (the port being used to receive). Such a failure may, for example, be due to the physical connection 106 becoming unplugged. In one embodiment, MAC hardware on NID 103 detects that the media has lost its carrier. In response to detecting this failure on Port 1, NID 103 completes execution of any active command for Port 1 with "flush status" (error status). A "link status" from NID 103 is then passed up through the NID device driver 113 and reaches the port aggregation driver 112.

Next (step 402), upon receiving this "link status", port aggregation driver 112 updates a list of PAG_ADAPT structures. Each PAG_ADAPT structure in the list identifies and defines a "team". Port aggregation driver 112 updates the appropriate team to indicate that the port designated as the "primary" port is failed and will change, and that the MAC addresses of Port 1 and Port 2 will be swapped.

Figure 3:
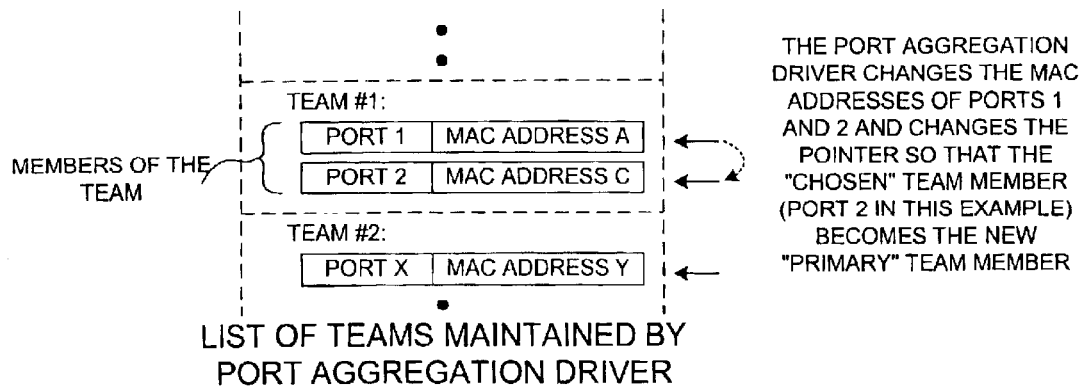
FIG. 3 is a diagram of a list of "teams" (actually it is a list of PAG_ADAPT structures, where each PAG_ADAPT structure in the list identifies a team). This list is maintained by a port aggregation driver in accordance with an embodiment of the present invention.

FIG. 3 is a diagram of part of this list of PAG_ADAPT structures. This list is maintained by port aggregation driver 112 in the form of a linked list. Each "team" comprises a number (one or more) of team "members". The team members are ports. In the exemplary method of FIG. 4, team #1 (see FIG. 3) represents the team associated with connection #1. Initially Port 1 is used as the receive port for TCP connection #1. Port 1 is therefore initially designated by a pointer to be the "primary" port. Upon the failure of Port 1, port aggregation driver 112 chooses another of the ports of the team (Port 2 in this example) to be the new "primary" team member. Port aggregation driver 112 therefore moves the pointer to indicate that Port 2 is the new primary team member. The moving of the pointer is indicated in FIG. 3 with the dashed arrow.

In addition to changing the primary team member, port aggregation driver 112 also swaps the MAC addresses of the two ports so that the MAC address previously associated with Port 1 is now associated with Port 2, and such that the MAC address previously associated with Port 2 is now associated with Port 1. Port aggregation driver 112 does this swapping by writing MAC A into the MAC address field for the Port 2 member, and by writing MAC C into the MAC address field for the Port 1 member.

Next (step 403), port aggregation driver 112 causes NID 103 to change the MAC address of Port 1 from MAC A to MAC C and to change the MAC address of Port 2 from MAC C to MAC A. Port aggregation driver 112 does this by calling a Microsoft operating system function, called the NDIS request function. NDIS stands for "network driver interface specification". The calling of the NDIS request function is a request for the operating system to do the designated NDIS function. The NDIS request has multiple parameters including a handle, and a pointer. The handle in this case identifies a port, the MAC address of which is to be changed. The pointer in this case points to a data structure, one subfield of which identifies another data structure. The other data structure in turn identifies an OID. In the present example, the OID (OID_ADD_802_3_ADDRESS) is a private OID that identifies the MAC address that the port identified by the handle is to use. Accordingly, port aggregation driver 112 calls the NDIS request function a first time to change Port 1's MAC address from MAC A to MAC C, and calls the function again to change Port 2's MAC address from MAC C to MAC A.

Next (step 404), the change of the MAC address on Port 2 of NID 103 causes NID 103 to initiate a flush by executing the "flush command." Execution of the flush command causes the TCB for the connection (TCB 117) to be passed back to host 102. ATCP stack 114 learns of the flush, takes control of TCP connection #1, and processing of TCP connection #1 switches from fast-path to slow-path.

Next (step 405), ATCP stack 114 in slow-path causes port aggregation driver 112 to have NID 103 send out a "gratuitous Address Resolution Protocol (ARP) request" to switch 105. This ARP request serves to advertise to switch 105 that the MAC address (MAC address A) that previously identified the failed Port 1 is now to be associated with Port 2. This gratuitous ARP request is sent because some intelligent switches, upon detecting the same MAC address on two physical ports, may function to isolate both ports. An isolated port is a failed port to the switch, and all communications from the isolated port would be ignored. NID 103 therefore sends the gratuitous ARP request out via Port 2 to cause such a sophisticated switch to reconfigure itself to know that MAC A is now associated with Port 2. In the case where device 105 is a less sophisticated switch or hub that does not attempt to isolate ports in this manner, receipt by device 105 of the gratuitous ARP request has no consequence. The method therefore works both in the case of a relatively sophisticated switch as well as in the case of a less complex switch or hub.

If transmit for TCP connection #1 is to remain on Port 2, and if Port 2 is now going to be associated with MAC A, then the MAC source address in TCB 119 must be changed from MAC C to MAC A. Accordingly, port aggregation driver 112 updates the TCB 119 (step 406) for TCP connection #1 by changing the MAC source address to be the MAC address of the selected member chosen for transmission. In the present example, this involves changing the MAC source address in TCB 119 from MAC C to MAC A. (The MAC destination address in TCB 119 remains MAC B).

Next (step 407), "fast-path" operation is resumed for TCP connection #1 such that Port 2 both receives and transmits packets for TCP connection #1. Host 102 passes control of TCP connection #1 back to NID 103 in a two-phase handout process. In the first phase (called "HANDOUT1"), host 102 instructs NID 103 to store and not forward to NID 103 subsequent packets for the specified TCP connection. In this case, the specified TCP connection is TCP connection #1 to be handed to the NID 103.

NID 103 receives this instruction, and responds back to host 102 with an acknowledgment. In the second phase (called "HANDOUT2"), host 102 passes control of the TCP connection #1 to NID 103 by moving (or copying) the TCB from memory on host 102 to memory on NID 103. The updated version of TCB 119 is illustrated in FIG. 2 as existing on NID 103 as TCB 117. "Fast-path" operation then automatically resumes for TCP connection #1 such that Port 2 both receives and transmits packets for TCP connection #1. NID 103 uses TCB 117 to build its transmit packets for connection #1 in accordance with teachings set forth in U.S. Pat. No. 6,247,060 (the subject matter of which is incorporated herein by reference).

Accordingly, a multi-port TCP offload NID performs initial "fast-path" processing of traffic for a TCP connection. A port being used to receive traffic for the TCP connection then fails. The MAC addresses of the failed port and a remaining functional port are swapped. The change of the MAC address on the new "primary" port causes the TCP connection to switch from "fast-path" processing to "slow-path" processing. The multi-port NID transmits an ARP request from one of its remaining functional ports to advertise that the MAC address that was on the failed port is now on another functioning port. The multi-port NID then resumes "fast-path" operation for the TCP connection but in this resumed "fast-path" operation the NID does not use the failed port. This fail-over functionality does not require a complex and sometimes unduly expensive Fast-Etherchannel switch. The MAC address of the NID seen by the switch for the TCP connection does not change, but rather moves from the failed port on the NID to another functioning port on the NID.

Figure 5:
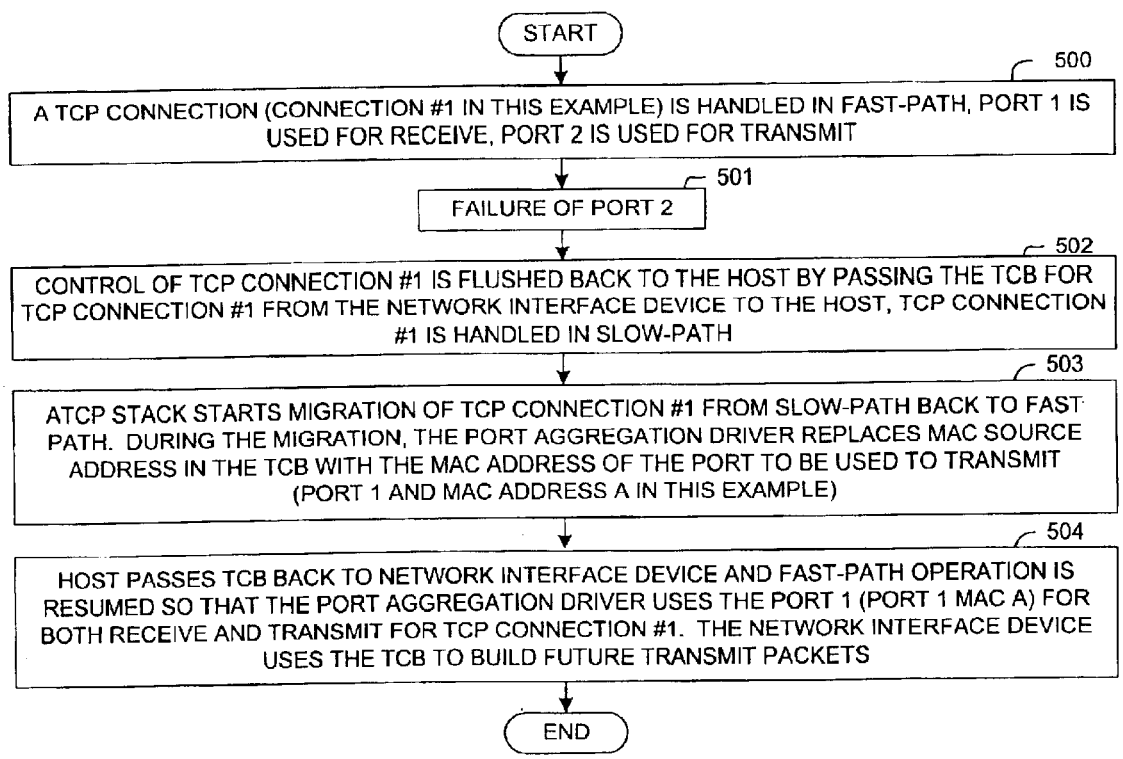
FIG. 5 is a flowchart of a method in accordance with an embodiment of the present invention where a transmit port fails.

FIG. 5 is a flowchart illustrating a method in accordance with another embodiment of the present invention. In this embodiment, a port fails that is used to transmit network communications for a "fast-path" TCP connection.

In an initial state (step 500,) TCP/IP packets associated with TCP connection #1 are being received onto NID 103 via Port 1 and are being transmitted from NID 103 via Port 2 as in the prior example. As in the prior example, TCP connection #1 is being handled in "fast-path."

Next (step 501), a failure occurs on Port 2 (the port being used to transmit TCP connection #1 packets from NID 103). Such a failure may, for example, be due to the physical connection 107 becoming unplugged. In one embodiment, MAC hardware on NID 103 detects that the media has host its carrier. In response to detecting this failure on Port 2, NID 103 completes execution of any active commands on Port 2 with "flush status" (error status). The NID device driver 113 also completes any pending commands for Port 2 with "flush status." NID 103 does a flush to transfer TCB 117 back to host 102. TCB 117 is written to memory on host 102 as indicated in FIG. 2 by reference number 119. Control of TCP connection #1 passes (step 502) from NID 103 to host 102 and processing for this TCP connection switches from "fast-path" to "slow-path." A "link status" from NID 103 is then passed up through the NID device driver 113 and reaches the port aggregation driver 112.

Next (step 503), upon receiving this "link status," the port aggregation driver 112 updates the appropriate team to indicate that Port 2 designated as "secondary" port is failed. The TCB 119 for TCP connection #1 holds a template header to be used by NID 103 in fast-path for the transmission of fast-path packets. This template header includes a MAC source address field to identify the MAC address of the transmitting port. In the present example, the port used to transmit is going to change from Port 2 to Port 1. Port aggregation driver 112 therefore updates the TCB 119 for TCP connection #1 by writing the MAC address of MAC A into the MAC source address field of TCB 119. (The MAC destination address in TCB 119 remains MAC B).

Once the TCB for TCP connection #1 has been updated, fast-path operation for TCP connection #1 is resumed (step 504) such that Port 1 (designated as MAC A) both receives and transmits packets for TCP connection #1. In one embodiment, host 102 passes control of TCP connection #1 to NID 103 in the two-phase handout process described above. In the first phase, host 102 uses the HANDOUT1 command to instruct NID 103 to store incoming packets for TCP connection #1. NID 103 then responds back to host 102 with an acknowledgement. In the second phase, host 102 uses the HANDOUT2 command to send the updated TCB to NID 103 and to resume fast-path operation of TCP connection #1. The updated TCB is stored on NID 103 as TCB 117.

Accordingly, a multi-port TCP offload NID performs initial "fast-path" processing of traffic for a TCP connection. A port being used to transmit traffic for the TCP connection then fails. This causes processing for the TCP connection to switch from "fast-path" processing to "slow-path" processing. The multi-port NID then resumes "fast-path" operation for the TCP connection but in this resumed "fast-path" operation the NID does not use the failed port. This fail-over functionality does not require a complex and sometimes unduly expensive Fast Etherchannel switch. The MAC addresses of the NID seen by the switch for the TCP connection does not change.

Figure 6:
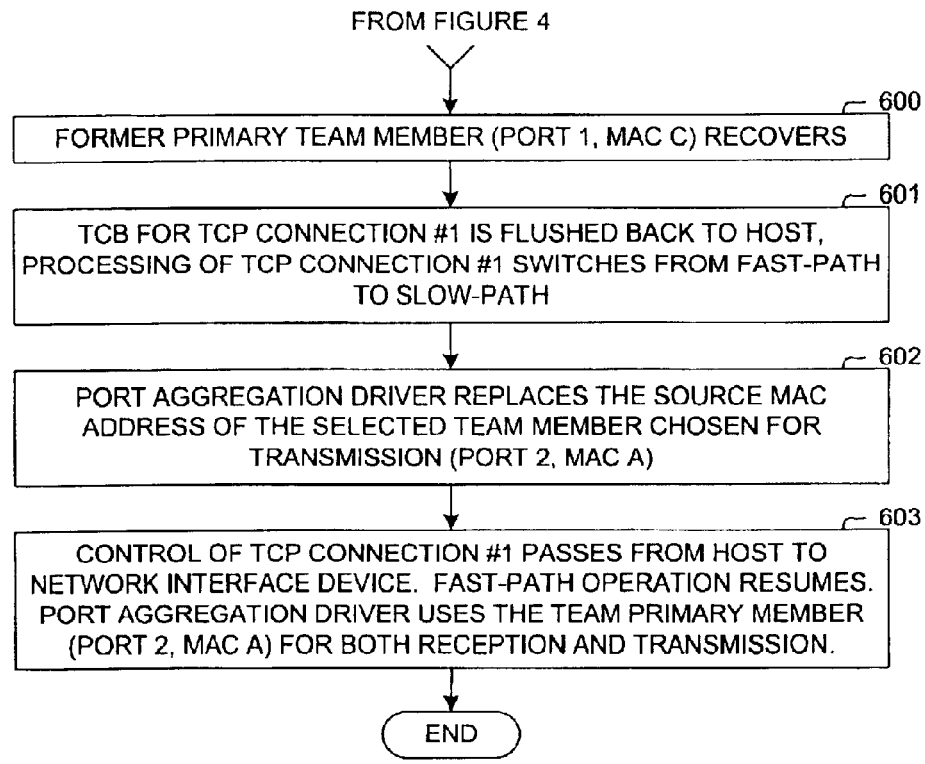
FIG. 6 is a flowchart of method steps that occur after the steps of FIG. 4 in accordance with one embodiment.

FIG. 6 is a flowchart showing steps that occur, in one embodiment, after the steps, of the method of FIG. 4. At the conclusion of the method of FIG. 4, TCP connection #1 is being handled in "fast-path." Port aggregation driver 112 is using the new "primary" team member (Port 2, MAC A) for reception and transmission after failure of the former "primary" member (Port 1, MAC C).

Next (step 600), the former primary member (Port 1, MAC C) recovers. Such a recovery may, for example, be due to the physical connection 106 being plugged in. In one embodiment, MAC hardware on NID 103 senses its media (detects that the media has its carrier present and determines the configuration of the link). A "link status" from NID 103 is then passed up through the NID device driver 113 and reaches the port aggregation driver 112. Upon receiving this "link status," the port aggregation driver 112 updates the appropriate team to indicate that Port 1 (the port formerly designated as "primary," but now designated as "secondary") is operational.

Next (step 601), TCB 117 for TCP connection #1 is flushed back to host 102 and processing of TCP connection #1 switches from "fast-path" to "slow-path." The flush may either be initiated by the ATCP stack 114 or be initiated by NID 103 due to a non-fatal reason. An example of a non-fatal reason is exception handling normally performed by the ATCP stack 114 in "slow-path."

Next (step 602), the ATCP stack 114 handles the exception and restarts migration of TCP connection #1 from "slow-path" to "fast-path." During the first phase of migration, the port aggregation driver 113 updates the TCB 119 for TCP connection #1 by changing the MAC source address to be the MAC address of the selected member chosen for transmission (Port 2, MAC A). The MAC destination address in TCB 119 remains MAC B.

Next (step 603), the second phase of migration of TCP connection #1 completes and control of TCP connection #1 passes from ATCP stack 114 to NID 103. "Fast-path" processing of TCP connection #1 resumes. The new "primary" member (Port 2, MAC A) is used for both reception and transmission.

Accordingly, a multi-port TCP offload NID performs initial "fast-path" processing of traffic for a TCP connection. A port which failed recovers and returns to operation. The TCP connection switches from "fast-path" processing to "slow-path" processing to handle an exception condition. The multi-port NID resumes "fast-path" operation for the TCP connection but in this resumed "fast-path" operation the NID does not use the recovered port for transmission.

Figure 7:
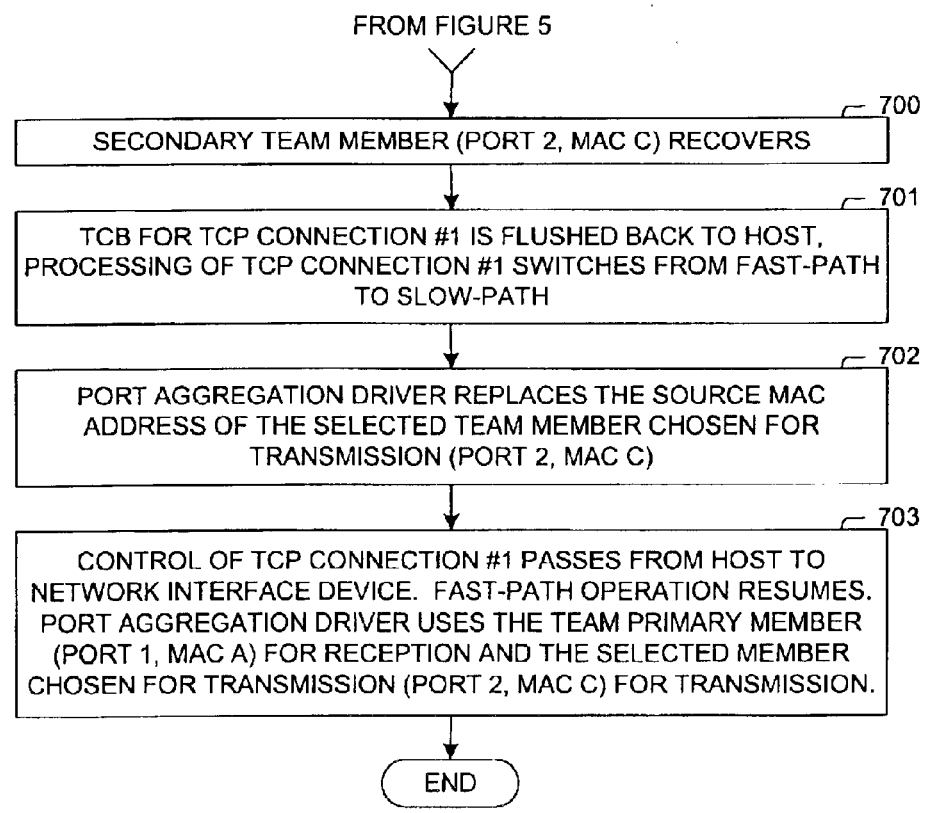
FIG. 7 is a flowchart of method steps that occur after the steps of FIG. 5 in accordance with one embodiment.

FIG. 7 is a flowchart showing steps that occur, in one embodiment, after the steps of the method of FIG. 5. At the conclusion of the method of FIG. 5, TCP connection #1 is being handled in "fast-path." Port aggregation driver 112 is using the "primary" team member (Port 1, MAC A) for reception and transmission after failure of the former "secondary" member (Port 2, MAC C).

Next (step 700), the secondary member (Port 2, MAC C) recovers. Such a recovery may, for example, be due to the physical connection 107 being plugged in. In one embodiment, MAC hardware on NID 103 senses its media (detects that the media has its carrier present and determines the configuration of the link.) A "link status" from NID 103 is then passed up through the NID device driver 113 and reaches the port aggregation driver 112. Upon receiving this "link status," the port aggregation driver 112 updates the appropriate team to indicate that Port 2 (the port designated as "secondary") is operational.

Next (step 701), TCB 117 for TCP connection #1 is flushed back to host 102 and processing of TCP connection #1 switches from "fast-path" to "slow-path." The flush may either be initiated by the ATCP stack 114 or be initiated by NID 103 for a non-fatal reason. An example of a non-fatal reason is exception handling normally performed by the ATCP stack 114 in "slow-path."

Next (step 702), the ATCP stack 114 handles the exception and restarts migration of TCP connect #1 from "slow-path" to "fast-path." During the first phase of migration, the port aggregation driver 113 updates the TCB 119 for TCP connection #1 by changing the MAC source address to be the MAC address of the selected member chosen for transmission (Port 2, MAC C). The MAC destination address in TCB 119 remains MAC B.

Next (step 703), the second phase of migration of TCP connection #1 completes and control of TCP connection #1 passes from ATCP stack 114 to NID 103. "Fast-path" processing of TCP connection #1 resumes. The team "primary" member (Port 1, MAC A) is used for reception and the selected "secondary" member chosen (Port 2, MAC C) is used for transmission.

Accordingly, a multi-port TCP offload NID performs initial "fast-path" processing of traffic for a TCP connection. A port which failed recovers and returns to operation. The TCP connection switches from "fast-path" processing to "slow-path" processing to handle an exception condition. The multi-port NID subsequently resumes "fast-path"

operation for the TCP connection but in this resumed "fast-path" operation the NID does use the recovered port for transmission.

The Compact Disc Appendix includes an implementation of a port aggregation driver in accordance with an embodiment of the present invention. The CD Appendix includes the following:

File buildchk.log is created as a result of compilation and contains a log of a checked build of the port aggregation driver. File buildfre.log is created as a result of compilation and contains a log of a free build of the port aggregation driver. File Makefile contains declarations and definitions for the NMAKE and BUILD facilities of the Microsoft program compilation environment. File netteam.inf contains declarations and definitions for the installation of the port aggregation configurator. File pag.c contains ANSI C logic implementing the main NDIS miniport driver entry point and initialization of the miniport and protocol driver functions to NDIS. File pag.h contains ANSI C logic implementing the basic data structures for the port aggregation driver. File pag.rc contains global version definitions for the ANSI C compilation facilities of the Microsoft program compilation environment. File pagmini.c contains ANSI C logic implementing the NDIS miniport driver functions. The function PSP (within file pagmini.c) modifies the MAC source address in the TCB to be the MAC address of the selected member chosen for transmission. File pagmisc.c contains ANSI C logic implementing support functions for the miniport and protocol driver functions. Some support functions (within file pagmisc.c) control the swapping of the primary member upon fail-over when selecting the new primary member. File pagproto.c contains ANSI C logic implementing the NDIS protocol driver functions. File precomp.h contains declarations and definitions for the ANSI C compilation facilities of the Microsoft program compilation environment. File sources contains declarations and definitions for the NMAKE and BUILD facilities of the Microsoft program compilation environment.

Although the present invention is described in connection with certain specific embodiments for instructional purposes, the present invention is not limited thereto. The load balancing and fail-over techniques set forth above are not limited to TCP connections, but rather apply to the load balancing and fail-over of connections of other transport layer protocols. Rather than control of a TCP connection being passed from the stack to NID 103 by moving the TCB itself, the TCB in one embodiment remains in a fixed location (either on the host or on the NID) and control of the TCB is passed from host to NID or from NID to host. NID 103 may, in some embodiments, be integrated into the host. NID 103 can be part of a memory controller integrated circuit, an input/output (I/O) integrated circuit, a peripheral controller integrated circuit, or a bridge integrated circuit of a microprocessor chip-set. In some embodiments, NID 103 is part of an I/O integrated circuit chip such as, for example, the Intel 82801 integrated circuit of the Intel 820 chip set. INID 103 may be integrated into the Broadcom ServerWorks Grand Champion HE chipset, the Intel 82815 Graphics and Memory Controller Hub, the Intel 440BX chipset, or the Apollo VT8501 MVP4 North Bridge chip. The load balancing and fail over methods set forth above are not only applicable to load balancing and fail over between different ports of a single NID, but rather are also applicable to load balancing and fail over from a port on one NID to a port on another NID, or from a port on one NIC card to a port on another NIC card. The port aggregation driver structures and techniques set forth above are not only usable with and/or in a Microsoft Windows operating system, but rather are also usable with and/in other operating systems including Unix, Linux, Novel, and Apple operating systems. Accordingly, various modifications, adaptations, and combinations of various features of the described embodiments can be practiced without departing from the scope of the invention as set forth in the following claims.

What is claimed is:

1. A method, comprising:

performing TCP protocol processing on a TCP offload device such that a host coupled to the TCP offload device is offloaded of substantially all TCP protocol processing tasks associated with communicating network information across a TCP connection between the TCP offload device and a second device, a first port of the TCP offload device being identified by a first MAC address, a second port of the TCP offload device being identified by a second MAC address, the first port of the TCP offload device being used to communicate said network information between the TCP offload device and the second device; and after a communication failure associated with the first port, switching from using the first port to communicate said network information between the TCP offload device and the second device to using the second port to communicate said network information between the TCP offload device and the second device, wherein after said switching the second port of the TCP offload device is identified by the first MAC address, wherein after said switching the TCP offload device performs substantially all TCP protocol processing associated with communicating said network information across the TCP connection via the second port.

2. The method of claim 1, wherein the TCP offload device is operable in a fast-path mode and in a slow-path mode, the host executing a protocol stack involving a plurality of protocol processing layers, wherein in the slow-path mode the stack of the host performs substantial TCP protocol processing on network information communicated across the TCP connection, and wherein in the fast-path mode the TCP offload device performs substantially all TCP protocol processing associated with communicating across the TCP connection such that the stack of the host performs substantially no TCP protocol processing for the TCP connection when in the fast-path mode.

3. The method of claim 2, wherein after said communication failure the TCP offload device switches from fast-path processing of the TCP connection to slow-path processing of the TCP connection, and wherein the TCP offload device then switches back to fast-path processing of the TCP connection such that the second port communicates said network information when the TCP offload device is in the fast-path mode.

4. The method of claim 1, wherein a block of information is maintained for the TCP connection, the block storing a state of the TCP connection, the block including MAC source address information for the TCP connection, the method further comprising:

replacing the MAC source address information of the block with the first MAC address, the replacing occurring after the communication failure and before the switching from the first port.

5. The method of claim 4, wherein the block of information is a transmit control block (TCB), wherein before said communication failure the second port was used to transmit network information for the TCP connection from the TCP offload device, and wherein after said communication failure the first port was used to transmit network information for the TCP connection from the TCP offload device.

6. The method of claim 1, wherein the second device is taken from the group consisting of: a switch and a hub.

7. The method of claim 1, wherein a first portion of said network information is communicated across the TCP connection between the TCP offload device and the second device before the communication failure, and wherein a second portion of said network information is communicated across the TCP connection between the TCP offload device and the second device after the communication failure.

8. The method of claim 1, wherein the network information is a TCP message.

9. The method of claim 1, the method further comprising:
transmitting an ARP request from the TCP offload device, the ARP request indicating that the first MAC address is associated with the second port, the ARP request being transmitted from the TCP offload device after the communication failure and before the switching.

10. The method of claim 1, wherein the network information communicated between the TCP offload device and the second device includes a first packet and a plurality of subsequent packets, and wherein the host performs TCP protocol processing on the first packet, and wherein the host performs no TCP protocol processing on the subsequent packets.

11. The method of claim 1, wherein before the communication failure a first portion of network information for the TCP connection is communicated via the first port of the TCP offload device and wherein a second portion of network information for the TCP connection is communicated via the second port of the TCP offload device, and wherein before the communication failure the first port is identified by the first MAC address and the second port is identified by the second MAC address.

12. A method, comprising:
load balancing network traffic between a first port of a TCP offload device and a second port of the TCP offload device, the network traffic being information communicated across a TCP connection between the TCP offload device and a second device, the first port being identified by a first MAC address, the second port being identified by a second MAC address; and
failing over from the first port to the second port such that the network traffic communicated across the TCP connection after the fail over is communicated via the second port and not via the first port, and wherein after the fail over the second port is identified by the first MAC address.

13. The method of claim 12, wherein the TCP offload device is coupled to a host, the host executing a stack of protocol processing layers, wherein during said load balancing said TCP offload device performs substantially all TCP protocol processing of said network traffic such that said stack performs substantially no TCP protocol processing of said network information, and wherein after the fail over said TCP offload device performs substantially all TCP protocol processing of said network traffic such that said stack performs substantially no TCP protocol processing of said network information.

14. The method of claim 13, wherein after the fail over the second port is identified by the first MAC address.

15. A set of instructions executable on a host, the host being coupled to a TCP offload network interface device, the set of instructions being for performing steps comprising:

(a) controlling the TCP offload network interface device such that the TCP offload network interface device fast-path processes network communications communicated between the TCP offload network interface device and a second device, the network communications being communicated across a TCP connection, the network communications being communicated via a first port of the TCP offload network interface device;

(b) maintaining a list of teams, one of the teams including a first team member and a second team member, the first team member identifying the first port of the TCP offload device and having a MAC address field associated with the first port, a first MAC address being in the MAC address field of the first port, the second team member identifying a second port of the TCP offload device and having a MAC address field associated with the second port, a second MAC address being in the MAC address field of the second port;

(c) in response to a communication failure associated with the first port, writing the first MAC address into the MAC address field of the second port; and (d) controlling the TCP offload network interface device such that the TCP offload network interface device communicates the network communications across the TCP connection via the second port and not via the first port, wherein the TCP offload network interface device fast-path processes the network communications after the failure, and wherein after the failure the second port of the TCP offload network interface device is associated with the first MAC address.

16. The set of instructions of claim 15, wherein the set of instructions controls the TCP offload network interface device in (a) at least in part by passing control of the TCP connection to the TCP offload network interface device, the set of instructions passing control of the TCP connection to the TCP offload network interface device by passing a Transmit Control Block (TCB) to the TCP offload network interface device.

17. The set of instructions of claim 15, wherein the set of instructions controls the TCP offload network interface device in (d) at least in part by passing control of the TCP connection to the TCP offload network interface device, the set of instructions passing control of the TCP connection to the TCP offload network interface device by passing a Transmit Control Block (TCB) to the TCP offload network interface device, the TCB including a template header, the template header having a MAC source address field, the MAC source address field containing the first MAC address.

18. The set of instructions of claim 15, wherein the TCP offload network interface device initially fast-path processes the network communications for the TCP connection in (a), then switches to slow-path processing of the network communications for the TCP connection, and then switches back to fast-path processing the network communications for the TCP connection in (d).

19. The set of instructions of claim 15, wherein the set of instructions includes a stack of protocol processing layers and a port aggregation driver, the port aggregation driver maintaining the list of teams.

20. A system comprising a network interface device operatively coupled to a host, the system comprising:
a first physical port;
a second physical port; and means for (a) load balancing first network traffic between the first physical port and the second physical port, the first network traffic being communicated across a single first TCP connection, wherein a first packet of the first TCP connection is communicated through the first physical port, wherein a second packet of the first TCP connection is communicated through the second physical port, and wherein during said load balancing the first physical port is identified by a first MAC address and the second physical port is identified by a second MAC address, and wherein the means is also for (b) failing over second network traffic communicated across a single second TCP connection, the second network traffic being failed over from one of the first and second physical ports to the other, wherein both before and after said fail over the network interface device fast-path processes the second network traffic of the second TCP connection such that the network interface device performs substantially all TCP protocol processing on the second network traffic and such that the host performs substantially no TCP protocol processing on the second network traffic.

21. The system of claim 20, wherein the means comprises the network interface device and a port aggregation driver on the host.

22. The system of claim 20, wherein a communication failure occurs, wherein in response to the failure the network interface device switches from fast-path processing the second network traffic to slow-path processing the second network traffic and passes control of the second TCP connection to the host, wherein the host then performs incidental TCP processing on the second network traffic, wherein the host then passes control of the TCP connection back to the network interface device, and wherein the network interface device then resumes fast-path processing on the second network traffic.

* * * * *